UNITED STATES PATENT OFFICE.

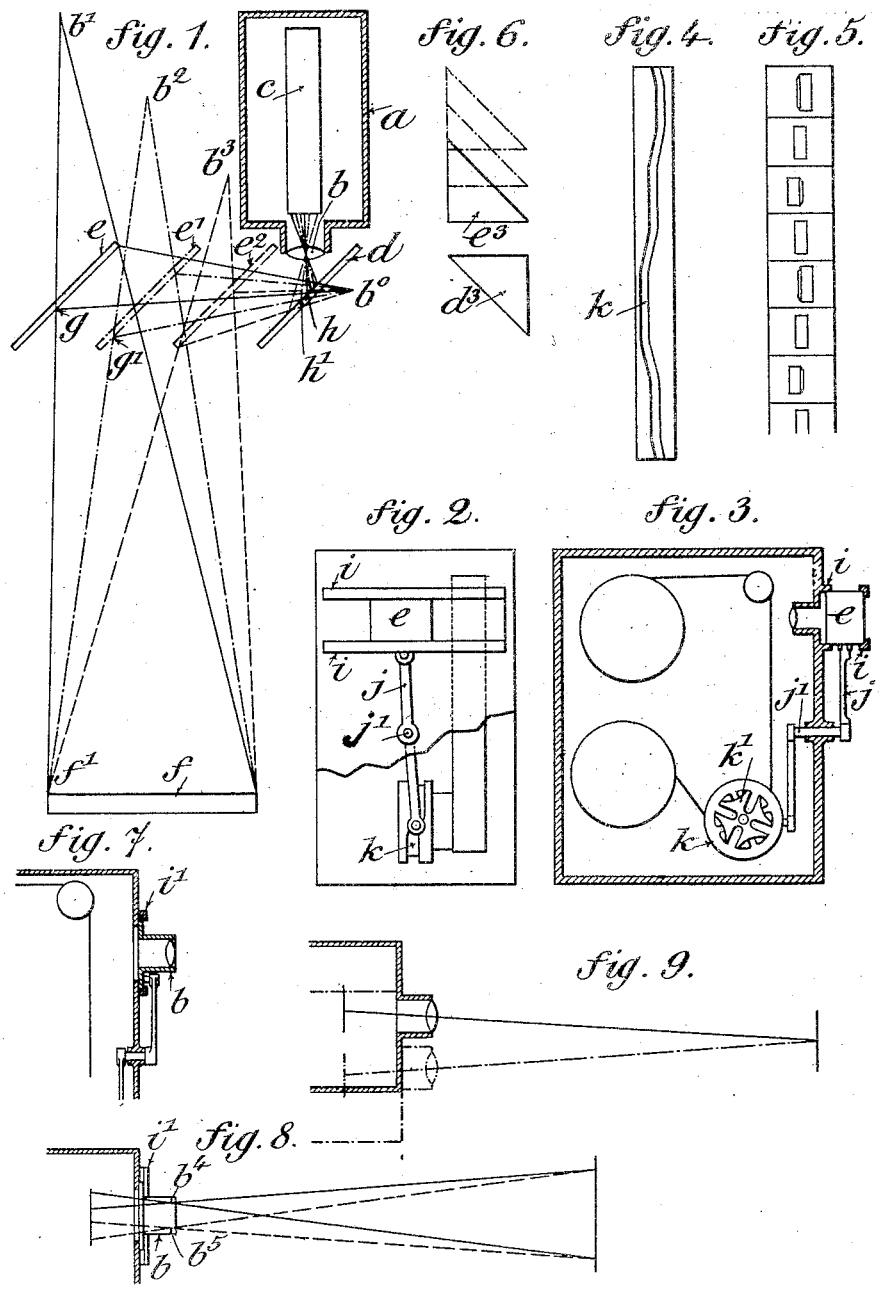

EMANUEL CERVENKA, OF PARIS, FRANCE.

STEREO-CINEMATOGRAPH.

1,163,892.     Specification of Letters Patent.    Patented Dec. 14, 1915.

Application filed October 19, 1911. Serial No. 655,531.

*To all whom it may concern:*

Be it known that I, EMANUEL CERVENKA, a subject of the Emperor of Austria-Hungary, residing at Paris, 2 Impasse Mazagran, in the Republic of France, engineer, have invented certain new and useful Improvements in Stereo-Cinematographs, of which the following is a specification.

This invention relates to a stereo-cinematograph, that is to an apparatus for taking and projecting cinematograph films giving directly the illusion of relief, without the aid of any member interposed between the stereographic picture and the eye of the spectator. Such apparatus is essentiallly distinguished from any usual cinematograph by the presence of a device which produces the deflection in opposite directions alternatively of the luminous rays which go from the object cinematographed to the film when the views are being taken, or from the film to the picture when the relief is being made, so that the successive views seem to be taken from different points. The effect thus produced on the eyes of the spectators may be compared to that which would be observed in looking at a fixed object alternatively with both eyes in quick succession.

The device serving to deflect the luminous rays alternatively to the right and to the left may be constructed in various ways in that between the film, on the one hand, and the picture or the animated object, on the other hand, there may be located one or more deflecting or refracting members, such as mirrors, prisms, and the like, and that the desired deflections may be obtained by the continuous motion of any one or of several of such deflecting or refracting members, or the object-glass of the cinematograph in concordance with the advancing motions of the film.

By way of example, the accompanying drawings show diagrammatically several embodiments of this invention.

Figure 1 is a diagrammatic plan view of the cinematograph provided with a series or set of mirrors giving the stereoscopic effect. Fig. 2 is a front elevation of a cinematograph provided with such a set of mirrors, with a part broken away. Fig. 3 is a vertical section of such apparatus. Fig. 4 shows on a larger scale a cam serving to move one of the mirrors. Fig. 5 shows a portion of the film and the position of a series of successive pictures on such film. Fig. 6 is a plan view of a series or set of prisms which may replace such series or sets of mirrors. Figs. 7 and 8 represent a vertical section and a plan view of an apparatus, the object-glass of which is movable. Fig. 9 is a diagrammatic plan view of an apparatus, of which the chamber, the obturator and the film move horizontally.

With reference to Figs. 1 to 8, $a$ designates a usual cinematograph apparatus the object-glass $b$ of which is fixed and in which the film $c$ moves step by step and vertically behind the object-glass in the well known manner. In front of the object-glass is located a fixed mirror $d$ sloping laterally; in parallellism with the latter is located a movable mirror $e$ which is successively brought toward and then away from the mirror $d$; such mirror $e$ occupies successively for instance the positions $e$, $e^1$, $e^2$, $e^1$, $e$, etc., while the film is moved forward step by step. $f$ designating any object, it will be seen that when the mirror $e$ is in the position shown in full lines, the luminous ray going from the point $f^1$ of such object to the center of the object-glass follows the path $f^1\ g\ h\ b$; the object $f$ is seen from the object-glass in the mirrors as if the object-glass were located at $b^1$ and the mirrors were withdrawn, the point $b^1$ being symmetric with regard to $e$ of the point $b^0$, which is itself symmetric with regard to $d$ of the center of the object-glass $b$. On the mirror $e$ being moved to $e^1$, the luminous ray follows the path $f^1\ g^1\ h^1\ b$ and the object is seen as if the object-glass were at $b^2$, the mirrors being withdrawn. Likewise, on the mirror being brought to $e^2$, the object $f$ is seen as if the object-glass were at $b^3$. So the successive pictures on the film $c$ can be seen from different points. What is meant here by "point of view" is that which is understood by the "eye" in perspective, and that which corresponds to the center of the object-glass in ordinary photography. It is to be noted that such pictures are slightly displaced transversely with regard to one another (see Fig. 5), but as the device operates in the same manner in taking views as for producing relief, it will be understood that the projections of the pictures will naturally assume one and the same position; the only resulting abnormal effect will be the alternative displacement of the point of view from right to left, which will give the required effect, although the spectators see the pictures directly. It is also to be noted that with such device the virtual point of view $b^1$ $b^2$ $b^3$ is displaced obliquely with regard to the object-glass, but without producing any appreciable defect, as such displacement is small in regard to the distance of the object $f$ or of the picture in relief.

Figs. 2 and 3 show how the movable mirror $e$ can be guided in the slide-ways $i$ and moved by means of a lever $j$ rocking around an axle $j^1$, such lever being controlled by a cam groove $k$ which turns in accordance with the wheel having a Maltese cross $k^1$ of the usual mechanism which serves to advance the film. To each advance made by the film there corresponds on the cam a part of the right hand groove, so that the mirror $e$ and the film remain stationary at the same time as well as move at the same time. The stroke of the mirror $e$ can be regulated by displacing the rocking axle $j'$ in the slide-ways, not shown in the drawings. In this embodiment of the invention, the mirror $e$ is supposed to assume besides the extreme positions to the right and left, an intermediate position of rest, but it must be understood that the latter position may be dispensed with. Without changing in any way the operation of the above described apparatus, for the mirrors $d$ $e$ may be substituted the total deflection prisms $d^3$ $e^3$ (see Fig. 6), one of which is fixed and the other movable.

Figs. 7 and 8 show a modified form of the apparatus in which neither a mirror nor a prism is interposed between the object-glass and the animated object of the picture to be projected; in such modification, it is the object-glass $b$ which reciprocates laterally so that the perspective point of view passes alternatively from the position $b^4$ to the position $b^5$ and vice versa. For such purpose, the object-glass may be mounted in horizontal slide-ways $i^1$ and be moved by a rocking lever as the movable mirror was in the previous embodiment. With such a device, the film may move only in the vertical direction, so that the pictures thereon are successively displaced to the right and left; but the support of the film may also be displaced transversely together with the object-glass, so that the pictures thereon will lie materially below one another, which will allow of the use of a narrower film. The same result may be obtained in causing the reciprocation to the right and left the whole cinematograph casing together with the object-glass and the film (see Fig. 9).

Claims.

1. In a cinematograph, the combination of means for advancing the film step by step, a fixed mirror located in front of the object-glass of the cinematograph and inclined laterally, a movable mirror directed parallelly to the said fixed mirror and means operatively connected to the means for advancing the film whereby the movable mirror is moved alternately away from and toward the said fixed mirror in accordance or register with the advancing movements of the film, substantially as described and for the purpose specified.

2. In a cinematograph, the combination of means for advancing the film step by step, a fixed mirror located in front of the object-glass of the cinematograph and inclined laterally, a movable mirror directed parallelly to the fixed mirror, and means operatively connected to the means for advancing the film whereby the movable mirror is moved alternately away from and toward the fixed mirror in such a manner that in each of its forward and backward movements the said movable mirror is advanced step by step in accordance with the advancing movements of the film.

In testimony that I claim the foregoing as my invention, I have signed my name in presence of two subscribing witnesses.

EMANUEL CERVENKA.

Witnesses:
H. C. COXE,
MAURICE ROUX.